US007509228B2

(12) United States Patent
Bielefeld et al.

(10) Patent No.: US 7,509,228 B2
(45) Date of Patent: Mar. 24, 2009

(54) SYSTEMS AND METHODS FOR FORECASTING CONTAINER DENSITY

(75) Inventors: Christopher F. Bielefeld, Louisville, KY (US); Jessica E. Myers, Louisville, KY (US); Rodger F. McLaughlin, Crestwood, KY (US); J. Todd Scott, Louisville, KY (US); James B. Moorman, Louisville, KY (US); John H. O'Brien, II, Jeffersonville, IN (US)

(73) Assignee: United Parcel Service of America, Inc., Atlanta, GA (US)

( * ) Notice: Subject to any disclaimer, the term of this patent is extended or adjusted under 35 U.S.C. 154(b) by 260 days.

(21) Appl. No.: 11/457,015

(22) Filed: Jul. 12, 2006

(65) Prior Publication Data

US 2007/0016538 A1 Jan. 18, 2007

Related U.S. Application Data

(60) Provisional application No. 60/699,008, filed on Jul. 13, 2005.

(51) Int. Cl.
*G06F 15/00* (2006.01)
*G01G 9/00* (2006.01)

(52) U.S. Cl. ...................................................... 702/173

(58) Field of Classification Search ................ 702/1, 702/128, 129, 173, 182; 705/41, 410
See application file for complete search history.

(56) References Cited

U.S. PATENT DOCUMENTS

| 6,952,628 | B2 | 10/2005 | Prutu |
| 7,313,460 | B1 * | 12/2007 | Prater et al. ................. 700/213 |
| 2001/0029473 | A1 * | 10/2001 | Yamaoka et al. ............... 705/27 |
| 2003/0130753 | A1 | 7/2003 | Grant et al. |
| 2003/0200111 | A1 | 10/2003 | Damji |
| 2004/0151068 | A1 | 8/2004 | Carlsruh et al. |

OTHER PUBLICATIONS

Search Report dated Jun. 19, 2008, PCT/US06/27041, Filed Jul. 12, 2006.

* cited by examiner

*Primary Examiner*—Bryan Bui
(74) *Attorney, Agent, or Firm*—Alston & Bird, LLP

(57) ABSTRACT

A system and methods for estimating the size of a parcel based on a mathematical formula derived from other parcels within a size category. The system may include a variety of modules in communication with a relational database for storing data related to parcels being delivered. Similar data may be retrieved from a variety of sources with embodiments of the present invention prioritizing the data based on the reliability of the source. In a further aspect, equipment needs are forecasted by evaluating parcel data over a period of time.

24 Claims, 8 Drawing Sheets

Mainframe Parcel Database 45

| Parcel Tracking Number 61 | Service Level 62 | Size Category 63 | Origin Center 64 | Size 65 | Weight 66 | Destination Center 67 |
|---|---|---|---|---|---|---|
| 1Z...2168 | NDA | Letter | 1230 | 0.025 | 0.67 | 7529 |
| 1Z...2034 | NDA | Letter | 4009 | – | 0.70 | 7529 |
| 1Z...8914 | NDA | Letter | 7529 | – | 0.61 | 4009 |
| 1Z...0891 | NDA | Small | 1230 | 0.057 | 2.26 | 7529 |
| 1Z...9701 | 2DA | Other | 4009 | 0.225 | 8.59 | 7529 |
| 1Z...3224 | 2DA | Small | 1230 | 0.070 | 2.81 | 7529 |
| 1Z...5581 | 2DA | Small | 7529 | – | 3.14 | 4009 |

. . .

| 1Z...3125 | 3DA | Other | 4009 | 0.282 | 12.77 | 1230 |
|---|---|---|---|---|---|---|
| 1Z...6477 | 3DA | Other | 4009 | 0.301 | 9.03 | 1230 |
| 1Z...1347 | 3DA | Small | 7529 | – | 3.36 | 4009 |

New Parcel Database 50

| Parcel Tracking Number 61 | Service Level 62 | Size Category 63 | Origin Center 64 | Size 65 | Weight 66 | Destination Center 67 |
|---|---|---|---|---|---|---|
| 1Z...2168 | NDA | Letter | 1230 | 0.025 | 0.67 | 7529 |
| 1Z...2034 | NDA | Letter | 4009 | 0.027 | 0.70 | 7529 |
| 1Z...8914 | NDA | Letter | 7529 | 0.025 | 0.61 | 4009 |
| 1Z...0891 | NDA | Small | 1230 | 0.057 | 2.26 | 7529 |
| 1Z...9701 | 2DA | Other | 4009 | 0.225 | 8.59 | 7529 |
| 1Z...3224 | 2DA | Small | 1230 | 0.070 | 2.81 | 7529 |
| 1Z...5581 | 2DA | Small | 7529 | 0.083 | 3.14 | 4009 |

. . . . . . .
. . . . . . .
. . . . . . .

| 1Z...3125 | 3DA | Other | 4009 | 0.282 | 12.77 | 1230 |
|---|---|---|---|---|---|---|
| 1Z...6477 | 3DA | Other | 4009 | 0.301 | 9.03 | 1230 |
| 1Z...1347 | 3DA | Small | 7529 | 0.107 | 3.36 | 4009 |

Fig. 6

SYSTEMS AND METHODS FOR FORECASTING CONTAINER DENSITY

CROSS-REFERENCE TO RELATED APPLICATIONS

This patent application is a U.S. Non-provisional application filed pursuant to Title 35, U.S.C. §§ 100 et seq. and 37 C.F.R. § 1.53(b), and claiming priority under Title 35, U.S.C. § 119(e) to a U.S. Provisional application bearing Application No. 60/699,008, filed Jul. 13, 2005, and entitled "Forecasting Container Density," which is incorporated herein by reference.

BACKGROUND

1. Technical Field

The following disclosure relates generally to the field of forecasting and, more particularly, to a system, method, and apparatus for analyzing actual shipping data in a worldwide shipping network to estimate the number of items or parcels per container, per aircraft or other vehicle, per day, along a particular shipping lane or route.

2. Description of Related Art

A significant challenge facing shipping enterprises such as United Parcel Service, Federal Express, DHL and postal services is determining future equipment needs such as, for example, the number of trucks needed to transport an expected volume of parcels from point to point. A parameter presently used to determine these needs is the number of items per container for a particular route, which is often referred to as the container density.

Currently, container density is estimated using a quick visual inspection, which often produces unreliable data. Typically, an individual will report the number of items loaded into a container and estimate the percentage of the container utilized by the loaded items. Using this data, the shipping enterprise makes equipment deployment and purchasing decisions. For example, the enterprise may decide not to add containers to a particular route if the estimated percent usage of the current container is low. However, because this data is based on unreliable estimates, additional equipment may be purchased when it is not necessary or insufficient quantities of containers may be available to handle an expected parcel volume.

Thus, there is a need in the art for systems and methods that provide a more accurate measure of container capacity usage and, in turn, provide a reliable forecast of future equipment needs.

SUMMARY OF THE INVENTION

The following summary is not an extensive overview and is not intended to identify key or critical elements of the apparatuses, methods, systems, processes, and the like, or to delineate the scope of such elements. This Summary provides a conceptual introduction in a simplified form as a prelude to the more-detailed description that follows.

In one embodiment of the present invention, a system for estimating the size of a select parcel having a weight and associated with one of a plurality of size categories is provided. This system includes one or more databases storing data associated with a plurality of parcels, said data including weight data, size data, and size category data for each of said plurality of parcels and a size estimating module. The size estimating module is configured to: retrieve weight and size data from said one or more databases for at least a portion of said plurality of parcels associated with the same size category as said select parcel; analyze said retrieved data to determine a mathematical relationship between weight and size; and estimate the size of said select parcel based on said mathematical relationship and said weight of said select parcel.

In another embodiment of the present invention a method of estimating the size of a first parcel of a plurality of parcels shipped by a shipping enterprise is provided. This method includes the steps of: associating each of said plurality of parcels with one of a plurality of categories based on relative size; assigning said first parcel to a first category based on its size, wherein said first category is taken from said plurality of categories; retrieving data including weight and size associated with a plurality of parcels in said first category; analyzing said data for said plurality of parcels in said first category to determine a mathematical relationship between weight and size; and applying said mathematical relationship to calculate the size of said first parcel based on its weight.

In a further embodiment of the present invention, a system for forecasting capacity requirements for a delivery lane is provided. The system includes a forecasting database storing data relating to a plurality of parcels for said delivery lane, said data for each parcel including weight data, size data, and data indicating one of a plurality of categories based on size, and wherein said size data for at least some of said plurality of parcels is an estimated value; and a forecasting module. The forecasting module is configured to: retrieve said size data from said forecasting database; calculate a cumulative size of said parcels by combining the size data for each of said plurality of parcels; and forecast size capacity requirements by applying a growth rate to said cumulative size.

In another embodiment of the present invention, a method for forecasting capacity needs for a delivery lane is provided. The method includes the steps of: gathering parcel data comprising weight data, size data and size category data for a plurality of parcels associated with said delivery lane wherein components of said parcel data are collected from a plurality of sources; building a database containing said parcel data; combining said size data to obtain a cumulative size; forecasting a future cumulative size by applying a growth rate to said cumulative size; and comparing said forecasted future cumulative size to a present capacity for said delivery lane to determine future equipment needs.

In an additional embodiment, a computer program product for estimating the size of a first parcel is provided. The computer program product is embodied on one or more computer-readable media and includes computer-executable instructions for: associating each of a plurality of parcels with a category based on relative size; assigning said first parcel to one of said categories based on its size; retrieving data including weight and size associated with a plurality of parcels in said one of said categories; analyzing said data for said plurality of parcels associated with said one of said categories to determine a mathematical relationship between weight and size; and applying said mathematical relationship to calculate the size of said first parcel based on its weight.

BRIEF DESCRIPTION OF THE DRAWING

The invention may be more readily understood by reference to the following description, taken with the accompanying drawing figures, in which:

FIG. 6 is a table illustrating the fields in a new parcel database, according to one embodiment of the present invention.

DETAILED DESCRIPTION

Figure 1:
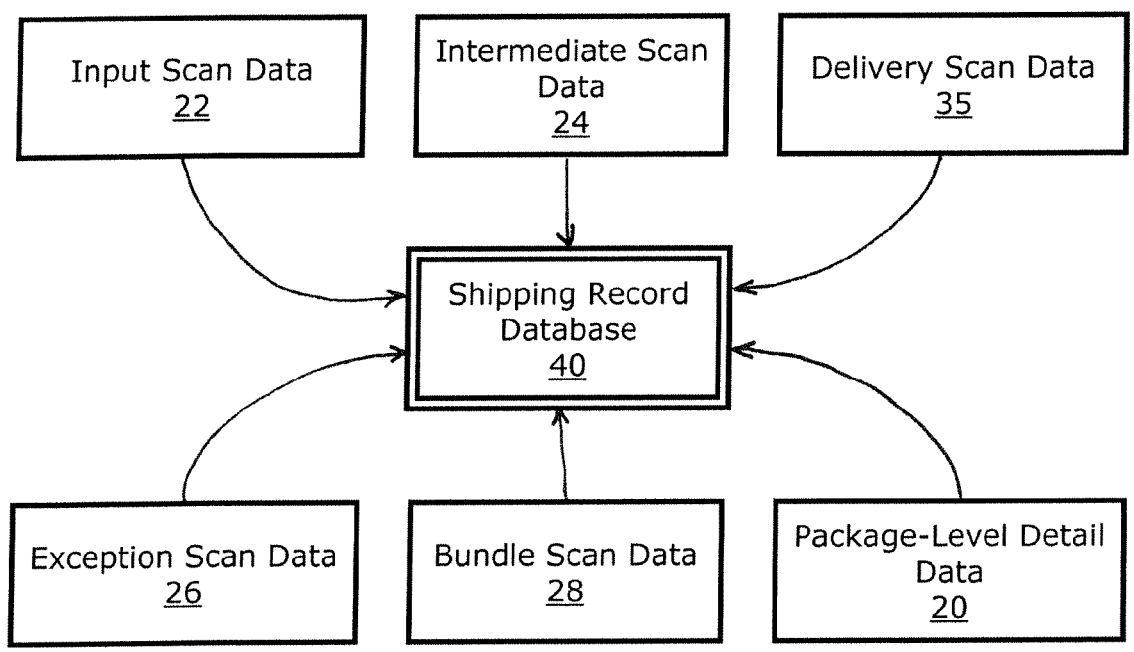
FIG. 1 is a diagram of various data sources used to create a shipping record database, according to one embodiment of the present invention.

Certain illustrative and exemplary apparatuses, methods, systems, processes, and the like, are now described herein, in connection with the following description and the accompanying drawing figures. In the following description, for purposes of explanation, numerous specific details are set forth in order to facilitate a thorough understanding of the apparatuses, methods, systems, processes, and the like. It may be evident, however, that the apparatuses, methods, systems, processes, and the like, can be practiced without these specific details. In other instances, well-known structures and devices are shown in block diagram form in order to simplify the description.

As used in this application, the term "computer component" refers to a computer-related entity, which may be hardware, firmware, software, a combination thereof, or software in execution. For example, a computer component can be, but is not limited to being, a process running on a processor, a processor itself, an object, an executable, a thread of execution, a program and/or a computer. By way of illustration, both an application running on a server and the server itself can be a computer component. One or more computer components cans reside within a process and/or thread of execution and a computer component can be localized on a single computer and/or distributed between and among two or more computers.

"Computer communications," as used herein, refers to a communication between two or more computer components and can be, for example, a network transfer, a file transfer, an applet transfer, an e-mail, a Hyper-Text Transfer Protocol (HTTP) message, XML, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Logic," as used herein, includes but is not limited to hardware, firmware, software and/or combinations of each to perform one or more functions or actions. For example, based upon a desired application or needs, logic may include a software controlled microprocessor, discrete logic such as an Application-Specific Integrated Circuit (ASIC), or other programmed logic device. Logic may also be fully embodied as software.

"Signal," as used herein, includes but is not limited to one or more electrical or optical signals, analog or digital, one or more computer instructions, a bit or bit stream, or the like.

"Software," as used herein, includes but is not limited to, one or more computer readable and/or executable instructions that cause a computer, computer component and/or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel-processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer or programmer or the like.

An "operable connection" (or a connection by which entities are "operably connected") is one in which signals, physical communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

"Database," as used herein, refers to a physical and/or logical entity that can store data. A database, for example, may be one or more of the following: a data store, a relational database, a table, a file, a list, a queue and so on. A database may reside in one logical and/or physical entity and/or may be distributed between two or more logical and/or physical entities.

It will be appreciated that some or all of the processes and methods of the system involve electronic and/or software applications that may be dynamic and flexible processes so that they may be performed in other sequences different than those described herein. It will also be appreciated by one of ordinary skill in the art that elements embodied as software may be implemented using various programming approaches such as machine language, procedural, object oriented, and/or artificial intelligence techniques.

The processing, analyses, and/or other functions described herein may also be implemented by functionally equivalent circuits like a digital signal processor circuit, a software controlled microprocessor, or an application specific integrated circuit. Components implemented as software are not limited to any particular programming language. Rather, the description herein provides the information one skilled in the art may use to fabricate circuits or to generate computer software to perform the processing of the system. It will be appreciated that some or all of the functions and/or behaviors of the present system and method may be implemented as logic as defined above.

To the extent that the term "includes" is employed in the detailed description or the list of exemplary inventive concepts, it is intended to be inclusive in a manner similar to the term "comprising " as that term is interpreted when employed as a transitional word in a claim. Further still, to the extent that the term "or" is employed in the list of exemplary inventive concepts (for example, A or B) it is intended to mean "A or B or both." When the author intends to indicate "only A or B but not both," the author will employ the phrase "A or B but not both." Thus, use of the term "or" herein is the inclusive use, not the exclusive use. See Garner, A Dictionary of Modern Legal Usage 624 (2d ed. 1995).

Many modifications and other embodiments may come to mind to one skilled in the art who has the benefit of the teachings presented in the description and drawings. It should be understood, therefore, that the invention is not be limited to the specific embodiments disclosed and that modifications and alternative embodiments are intended to be included within the scope of the disclosure and the exemplary inventive concepts. Although specific terms may be used herein, they are used in a generic and descriptive sense only and not for purposes of limitation.

Shipping Data

The present invention may be described generally herein in the context of a worldwide parcel shipping enterprise, although its applicability to other endeavors will be plainly understood and appreciated by those skilled in the art. The term parcel, as used herein, refers generally to a discrete package or item to be transported from a shipper to a receiver or consignee. One or more parcels may be placed in a container. One or more containers may be placed in an aircraft, on a ship, or on any other vehicle for transport.

Each parcel generally has a weight and a size. Each parcel may be marked or otherwise associated with a parcel tracking number, for tracking purposes. The tracking number may be embedded or otherwise related to another mark or indicia on an item or parcel, including but not limited to a UPS® Maxi-Code symbol, a bar code, an RFID tag, or other indicia. A computer system may be used to monitor the status of each parcel, using the parcel tracking number. A computer system may also be used to store certain indicia or data related to each parcel.

FIG. 1 is a high-level block diagram illustrating a system of cooperating databases, according to one embodiment of the present invention. Shipping enterprises typically collect various data that describe the items or parcels being delivered, and this data may be used to build a shipping record database 40. The shipping record database 40 may include data for each parcel, including for example the tracking number, service level, weight, size, as well as data related to the parcel's origin and its destination. The shipping record database 40 may be used to monitor parcels currently in transit and/or it may be used to store data about parcels delivered in the past.

As illustrated in FIG. 1, various data stores may be accessed in order to build a shipping record database 40 that includes any desired set of data. For example, the input scan data 22 may include a record of data about a parcel obtained when it first entered the system. The data may be obtained from a scan or other inspection of the parcel, including the scanning of a code on the parcel which refers to additional data about the parcel. During the parcel's transit from an origin to a destination, intermediate scan data 24 may be obtained at various waypoints and stored. Similarly, if there is a problem or exception to the normal handling procedures, exception scan data 26 may be obtained and stored. One or more items or parcels may be placed together or bundled into a larger container, at which point the bundle may be scanned and information about the container and its contents may be stored as bundle scan data 28.

Package-level detail data 20 may also be compiled and may include a variety of data about a parcel such as a manifest provided by the shipper, shipper identifiers, the delivery or consignee address, other consignee identifiers, a parcel tracking number, a service level, a weight, a size, payment information, various fields for reference information, and additional fields for purposes related to the handling and/or shipment of a parcel in transit. The package-level detail data 20 may also include data for use in tracking the movement of a parcel in transit, such as an origin scan indicating collection of the parcel, intermediate scans at various waypoints and/or sorting locations, and a destination scan indicating final delivery of the parcel. In this aspect, the package-level detail data 20 provides a history for each parcel, where the parcel tracking number may serve as an index for locating all the recorded data associated with each parcel. By sending a query to the package-level detail data 20, a user may obtain a multitude of information about a particular parcel.

The delivery scan data 35, also shown in FIG. 1, may include data obtained about a parcel when it is delivered to the consignee. The delivery scan may be accomplished by the person or driver making the delivery, using a portable device to record information such as the date, time, location, consignee identity, consignee signature, and other data related to the delivery, captured at or near the moment of delivery and related to the parcel tracking number. In this way, the delivery scan data 35 provides a final entry in the manifest record for a parcel.

The shipping record database 40 may be built or compiled using all the data stored by a shipping enterprise during a certain time period. For example, the shipping record database 40 may be compiled on a daily, weekly, monthly, or other basis.

Transport Containers

The present invention may be described generally herein in the context of airborne transport containers, referred to generally as air containers. Other types of containers, however, may be analyzed using the inventive system and method, as will be plainly understood and appreciated by those skilled in the art. The term container, therefore, as used herein should be understood to include all types of transport containers of any kind. Air containers may be sized and shaped to fit within one or more particular models of cargo aircraft. Land containers may be sized and shaped to fit within seagoing vessels, freight trains, or highway tractor-trailers. Other containers may be sized and shaped to fit any of a variety of transport vehicles. Broadly speaking, of course, each transport vehicle includes a container of some kind, such as a cargo hold, flat trailer, van compartment, shelf, and the like. The concepts of container usage and container density, as explained herein will be readily applicable to fields of endeavor outside parcel shipping and also applicable to all types of containers.

Containers of containers. Moreover, the inventive concepts may apply equally as well to containers placed within larger containers, whether directly loaded onto a transport vehicle or not. In some systems, small items may be bundled together and placed into a larger container; the number of items per container may be analyzed and forecasted using the present invention. Similarly, the larger container may be grouped together with others and placed into a still bigger container, where the number of larger containers per bigger container may also be analyzed and forecasted using the present invention.

Parcel Size and Weight Data

Figure 2:
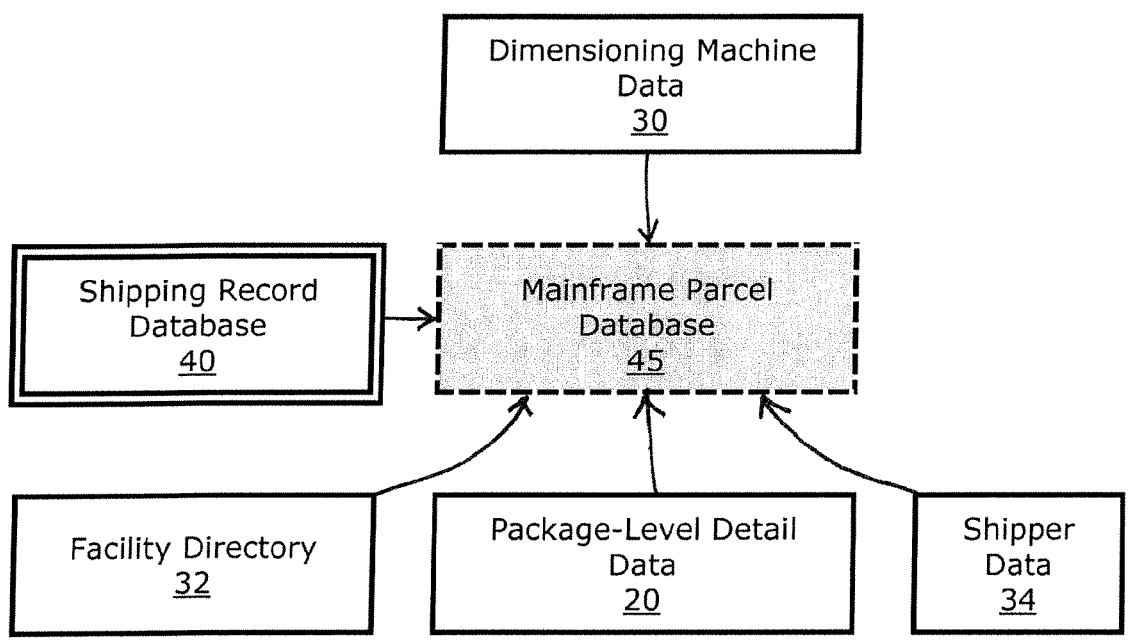
FIG. 2 is a diagram of various data sources used to create a mainframe parcel database, according to one embodiment of the present invention.

In one embodiment, the system 10 of the present invention may include the compilation or building of a mainframe parcel database 45 including the weight and size of each parcel of interest. As illustrated in FIG. 2, the mainframe parcel database 45 may use data from one or more of the shipping record database 40 (compiled from various data sources, as shown in FIG. 1), the package-level detail data 20, dimensioning machine data 30, a facility directory 32, shipper data 34, or other sources.

Parcel Size. The other various data sources shown in FIG. 2 may include data from dimensioning machines. In a transport system where there is a need to determine size of items or parcels in transit, one or more dimensioning machines or systems may be used. Sensors placed along a conveyor, for example, may be used to determine the length, width, and height of an item or parcel as it moves along the conveyor. U.S. Pat. No. 6,952,628 to Prutu discloses a system for measure the dimensions of a package and is incorporated herein by reference. The dimension data may be stored, and it may be related to a specific parcel using the parcel tracking number. As illustrated in FIG. 2, the dimensioning machine data 30 may be accessed and the size data used to contribute to the mainframe parcel database 45.

Parcel Weight. In general, the shipping record database 40 may include the parcel weight, as derived from any of the data sources shown in FIG. 1. For example, the package-level detail data 20 may include a weight. The input scan data 22 may include a weight obtained when the parcel entered the shipping system.

Some types of dimensioning machines also obtain a weight measurement or estimate, so the dimensioning machine data 30 may also include a parcel weight. In some transport systems, however, not every parcel will pass by a dimensioning machine. Other sources of size and weight data may therefore be needed. Shipper data 34 may include the size of the parcel as measured or estimated by the sender. The package-level detail data 20 may also include size data or individual dimensions.

Facility Data. As shown in FIG. 2, the mainframe parcel database 45 may include data obtained from a facility directory 32. In one embodiment, the system 10 of the present invention analyzes the transport of parcels and containers between and among various facilities in a service territory. The facility directory 32 may be used, for example, to identify the facility nearest the origin of a parcel, and to identify the facility nearest the destination. In order for the data to be useful when analyzing and forecasting the movement of parcels and containers between and among various facilities, the mainframe parcel database 45 may be built to include the identity of an origin facility and destination facility. Those skilled in the art will recognize that there may be multiple intermediate facilities through which a parcel may pass en route from an origin facility and a destination facility. Furthermore, any of these intermediate facilities may be considered an origin facility or destination facility for a given delivery lane when calculating container density and usage.

Figure 5:
FIG. 5 is a table illustrating the fields in a mainframe parcel database, according to one embodiment of the present invention.

Once completed, the mainframe parcel database 45 may include several fields of data for each parcel, as illustrated in FIG. 5. The simplified table in FIG. 5 illustrates the data, stored in rows and columns; one row for each parcel. The mainframe parcel database 45 may include thousands of rows, or more. As shown, each parcel may be identified by a parcel tracking number 61, a service level 62, a size category 63, an origin center 64, a size 65, a weight 66, and a destination center 67. The parcel tracking number 61, as described herein, may be an alphanumeric code unique to a single parcel. The tracking number 61 or other data described may be embedded in or otherwise related to another mark or indicia on each item or parcel, including by not limited to a UPS® MaxiCode symbol, a bar code, an RFID tag, or any other type of indicia. The service level 62 may be used to differentiate between items or parcels being shipped according to certain parameters. For example, the initials NDA may refer to Next-Day Air service, 2DA may refer to Second-Day Air service, and 3DA to Third-Day Air. Any of a variety of service levels, of course, may be used depending on the services provided. Similarly, the size category 63 field may be used to describe the general size and shape of an item or parcel. For example, "Letter" may refer to a flat envelope, "Small" may refer to a parcel or package smaller than a certain limit, and "Other" may refer to larger or non-small parcels. The origin center 64 and destination center 67 fields may include identifiers indicating the facility used to process or otherwise handle each parcel.

The column for weight 66, as shown, may include a weight for each parcel. The weight 66 may be obtained from any one of the sources described herein. In one embodiment, the system 10 of the present invention includes a prioritized list of possible sources of a weight measurement, with the most reliable source given top priority and less-reliable sources assigned lower priorities. In this aspect, the system 10 of the present invention may select from among a variety of possible weight inputs and select the most reliable weight to include in the mainframe parcel database 45.

Similarly, the column for size 65, as shown, may include a size for each parcel. The size 65 may be obtained from any one of the sources described herein. In one embodiment, the system 10 of the present invention includes a prioritized list of possible sources of a size measurement, with the most reliable source given top priority and less-reliable sources assigned lower priorities. In this aspect, the system 10 of the present invention may select from among a variety of possible size inputs and select the most reliable size to include in the mainframe parcel database 45. The system 10 may calculate a size 65 based on individual measurements of length, width, and height. In one embodiment, the system 10 may assign a standard size 65 to a parcel based on its service level 62, size category 63, or a combination of the two. For example, a parcel shipped using next-day air service inside a standard letter size may be assigned a standard size, as limited by the standard letter envelope.

As illustrated in the example table of FIG. 6, not every parcel includes a size 65. When the size 65 is not available from any of the various data sources, the field for size 65 is null or empty.

Figure 3:
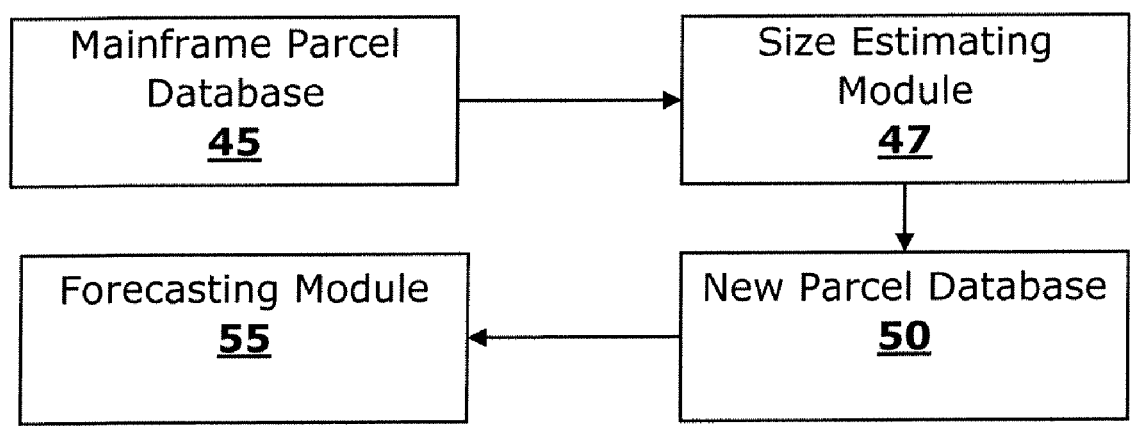
FIG. 3 is a diagram of various modules in communication with databases according to one embodiment of the present invention.

Turning to FIG. 3, an embodiment of the present invention includes several computer modules for performing calculations using accumulated data. In the illustrated embodiment, a size estimation module 47 is in communication with the mainframe parcel database and provides size estimates for parcels having null or empty size fields 65. Generally described, the size estimation module 47 analyzes several parcel records to generate a mathematical relationship between the weights and sizes of the parcels. From this analysis, the size estimation module 47 can estimate the size of parcels in which the size field 65 in the mainframe parcel database 45 is null or empty. This estimated data along with other data provided from the mainframe parcel database 45 may be used to generate a new parcel database or forecasting database 50.

In addition, embodiments of the present invention may also include a forecasting module 55 for predicting equipment needs based on gathered data. The forecasting module is a computer component in communication with the new parcel database 50. Generally described, the forecasting module 55 analyzes parcel data for a given time period and calculates the future equipment needs for a given delivery lane.

Method of Estimating Parcel Size

Although many modern shipping enterprises include parcel measuring devices in their delivery network, often size data is unavailable for at least a portion of the parcels delivered. As will be understood by those skilled in the art, missing size data may be due to a variety of reasons such as equipment failures, partial deployment of measuring devices, or data corruption. In one aspect of the present invention, the size of these parcels is estimated based on other collected data.

Figure 4:
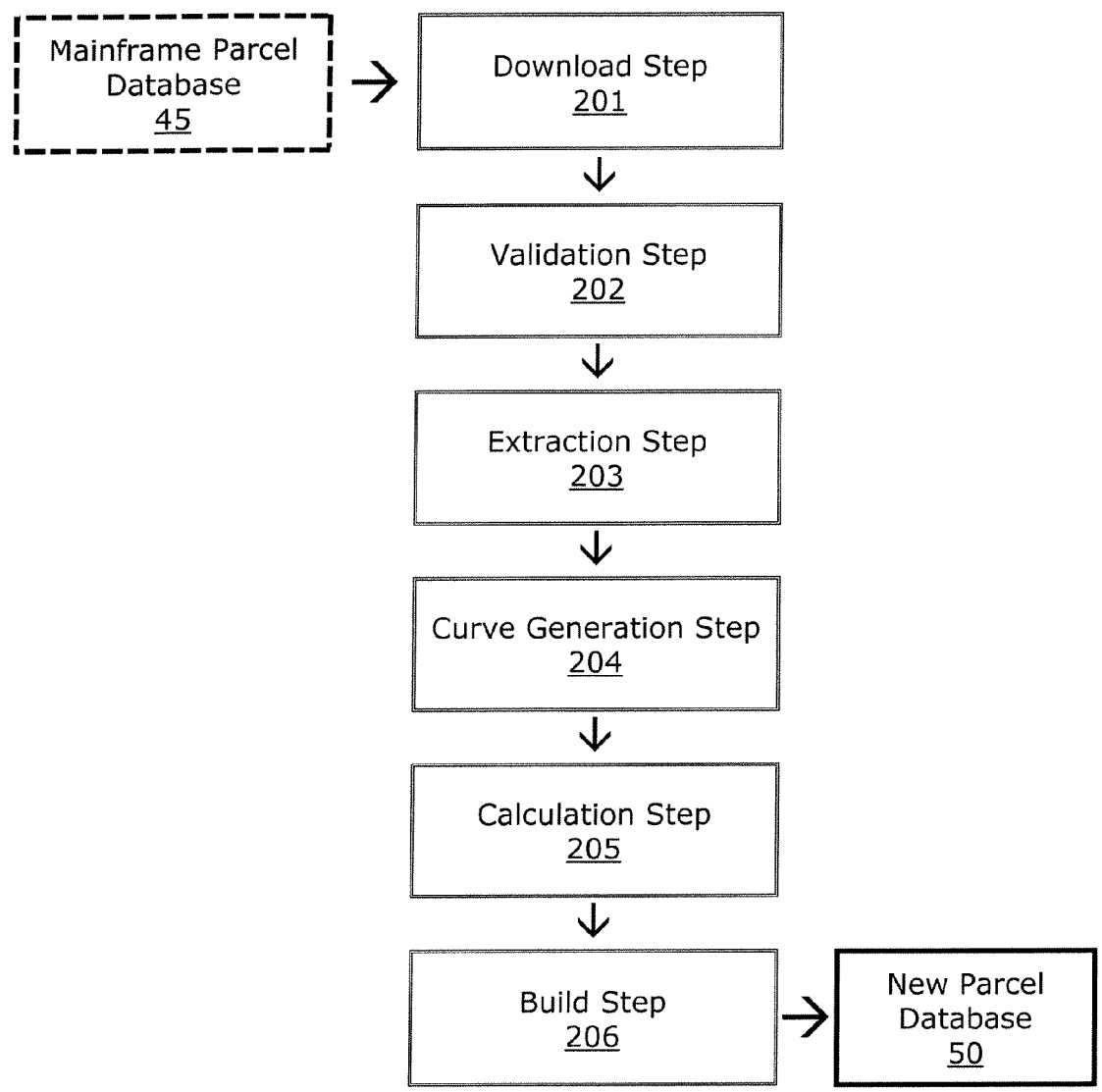
FIG. 4 is a flow chart illustrating the steps in a method, according to one embodiment of the present invention.

In one embodiment, the present invention includes a method for estimating parcel size, as illustrated in FIG. 4. Beginning with the data stored in the mainframe parcel database 45, illustrated in FIG. 5, the method of the present invention may include a download step 201, in which the mainframe parcel database 45 or a portion of it may be downloaded from a remote server or other computer system to a local computer for additional processing by the size estimation module 47.

The method of the present invention may include a validation step 202 performed by the size estimation module 47, in which the data entries in one or more fields are compared against a range of permissible values and validated. The validation step 202, as well as other steps in this inventive method, may be carried out or otherwise executed by a computer script or query language such as Perl. Perl is a stable, open source, cross-platform programming language, available under a general public license. Perl includes a DBI (database interface) module that enables Perl applications or scripts to access any of a variety of database types.

In one embodiment, the method of the present invention may include an extraction step 203, in which only the parcel data that includes a size 65 is extracted from the mainframe parcel database 45 by the size estimation module 47. In this step 203, a data set is created in which all parcels have a size.

Using the extracted data with sizes, the size estimation module 47 may include a curve generation step 204. In one embodiment, the size and weight data may be used to generate a size-versus-weight curve. Based on the data for the parcels that include both a size and a weight, the following general formula may be used to plot a graph of a size-versus-weight curve:

$$\text{Size} = c1 + c2 * \text{Weight} + c3 * CAT$$

In this general formula, the coefficients $c1$, $c2$, and $c3$ are numerical constants, and the CAT variable may be adjusted depending on the particular size category 63 of the parcels in a sample. For example, the CAT variable may be set to zero for small parcels and one for other parcels.

In general, as the size of a parcel increases, the expected weight also increases; however, the relationship is often not linear and also will vary depending on the parcels in a sample. Small parcels may be relatively heavy; large parcels may be relatively light. Also, parcels shipped according to different service levels 62 may have a size-weight relationship that is dependent upon or related to the particular service level. In any event, a size formula may be used to generate a curve for each of a variety of service classes:

$$NDA\_Size = c1 + c2 * \text{Weight} + c3 * CAT \quad [1]$$

$$2DA\_Size = d1 + d2 * \text{Weight} + d3 * CAT \quad [2]$$

$$3DA\_Size = e1 + e2 * \text{Weight} + e3 * CAT \quad [3]$$

In the above equations, the coefficients $c1$, $c2$, and $c3$ are the numerical constants for parcels shipped using NDA or Next-Day Air service; $d1$, $d2$, and $d3$ are the numerical constants for parcels shipped using 2DA or Second-Day Air service; and $e1$, $e2$, and $e3$ are the numerical constants for parcels shipped using 3DA or Third-Day service.

The curve generation step 204, in general, may include a statistical analysis of the data for each service level (NDA, 2DA, and 3DA). The statistical analysis produces the specific numerical constants ($c1$, $c2$, $c3$; $d1$, $d2$, $d3$; and $e1$, $e2$, $e3$) for each set of data.

Determining the numerical constants produces an equation with known values and, also, produces an equation or curve capable of being plotted on a graph. The statistical analysis may be performed using any of a variety of methods. The equation selected may be generally linear in form, like the expressions in equations [1] through [3] above, or the model equation may take a different form, depending on the expected shape of the curve and the data set to be analyzed. The analysis may be completed using a statistical analysis software product, such as SPSS® statistical procedures software, provided by SPSS, Inc.

The units of measurement for the equations, in general, may be established so that the size produced by the calculations is in cubic feet, or cubic inches, or any other volumetric measure. The numerical constants ($c1$, $c2$, etc.) will be measured in units accordingly. For example, if the desired unit is cubic feet, for example, the numerical constant $c1$ may be expressed in cubic feet; for weights in pounds, the constant $c2$ may be expressed in cubic feet per pound; and the constant $c3$ (which is multiplied by either zero or one) may be expressed in cubic feet.

Using the equations above and the constants generated, the size of the unknown parcels may be calculated in the calculation step 205. For example, equation [1] above may be used to calculate the size of a parcel shipped using service level NDA, using the parcel's known weight and the values of $c1$, $c2$, and $c3$. If the parcel size category is small, the CAT variable may be set to zero. Thus, equation [1] reduces to: NDA_Size=$c1+c2$*Weight. If the curve generation step 204 produces a $c1$ value of 0.0114 cubic feet and a $c2$ value of 0.8026 cubic feet per pound, and the weight of the parcel is 0.6119 pounds, then the parcel size, NDA_Size=0.0114 cubic feet+(0.3026 cubic feet per pound) times (0.6119 pounds) =0.1966 cubic feet.

After the sizes are calculated for each of the unknown parcels, the build step 206 in one embodiment may include the compiling and building of a new parcel database 50 that includes a size and weight for every parcel. A new parcel database 50 is illustrated in FIG. 6, with the calculated sizes in bold.

Use of the New Parcel Database in Forecasting

As shown in FIG. 6, the new parcel database 50 may include the identity of an origin facility or center 64 and a destination center 67. The combination of an origin center 64 and a destination center 67 may be referred to as a center pair. In order for the forecasting module 55 to analyze parcel data from past shipments, and forecast the needs for future shipments, it is often helpful to consider the flow of parcels in terms of center pairs. One such center pair, for example, may be Roswell-Greenville, where the origin center 64 is a facility in Roswell, Ga. (outside Atlanta) and the destination center 67 may be a facility in Greenville, S.C. (near Columbia).

The shipping enterprise may associate one or more shipping lanes for travel between endpoints of a center pair. For example, the shipping lanes between Roswell and Greenville may include the air shipping lane between the Atlanta airport (ATL) and the Columbia airport (CAE) and one or more separate ground transport shipping lanes. For items or parcels traveling by Next-Day Air service, for example, the center pair Roswell-Greenville may necessarily include the air lane between ATL-CAE. In this respect, the centers 64, 67 identified in the new parcel database 50 may be used to identify parcels that would ordinarily travel along a particular air lane.

In one embodiment, the forecasting module 55 may calculate the total size of all the parcels shipped along a transportation lane, for example the air lane ATL-CAE, using data from the new parcel database 50. The parcels of known size, as well as the parcels having a size calculated by the method above, would be included in a sample.

Suppose, for example, a sample of parcels traveling along the ATL-CAE air lane included a total of 10,208 parcels having a total size of 4,640.21 cubic feet, as determined from the data in the new parcel database 50. If the capacity of a standard container is known, we can calculate the number of containers used for such a transport. For example, a standard A2N air container has a capacity of 420 cubic feet. When it appears full by visual inspection, it may be estimated that the parcels actually consume about 70% of the container by volume, or 294 cubic feet, which may be referred to as the practical container capacity. Dividing the total parcel volume of 4,640.21 cubic feet by the practical container capacity of 294 cubic feet, it may be calculated that 15.78 containers, at capacity, would be required to transport that sample of parcels over the particular air route ATL-CAE. It may also be of interest to know the average number of parcels per container, or the container density. Dividing the total number of parcels (10,208) by the number of containers (15.78) shows that each container carries an average of 646.77 parcels.

These values, produced by the improved system and method described herein, will produce a generally reliable set of data for us in analyzing parcel data from past shipments, and for forecasting future shipments. If daily parcel volume is expected to grow, for example, in a particular geographic region, then forecasting methods may be used to apply an incremental growth rate to the number of parcels along a particular route, which in turn affects the number of parcels to be transported by vehicle and by aircraft. Increased volume may indicate a need for an increased number of containers and/or a larger transport vehicle to move those containers. In this aspect, the improved data calculated by the inventive method and stored in the new parcel database 50 may be used to produce more accurate forecasts. Forecasting represents just one possible use of the improved data stored in the new parcel database 50.

System Architecture

Figure 7:
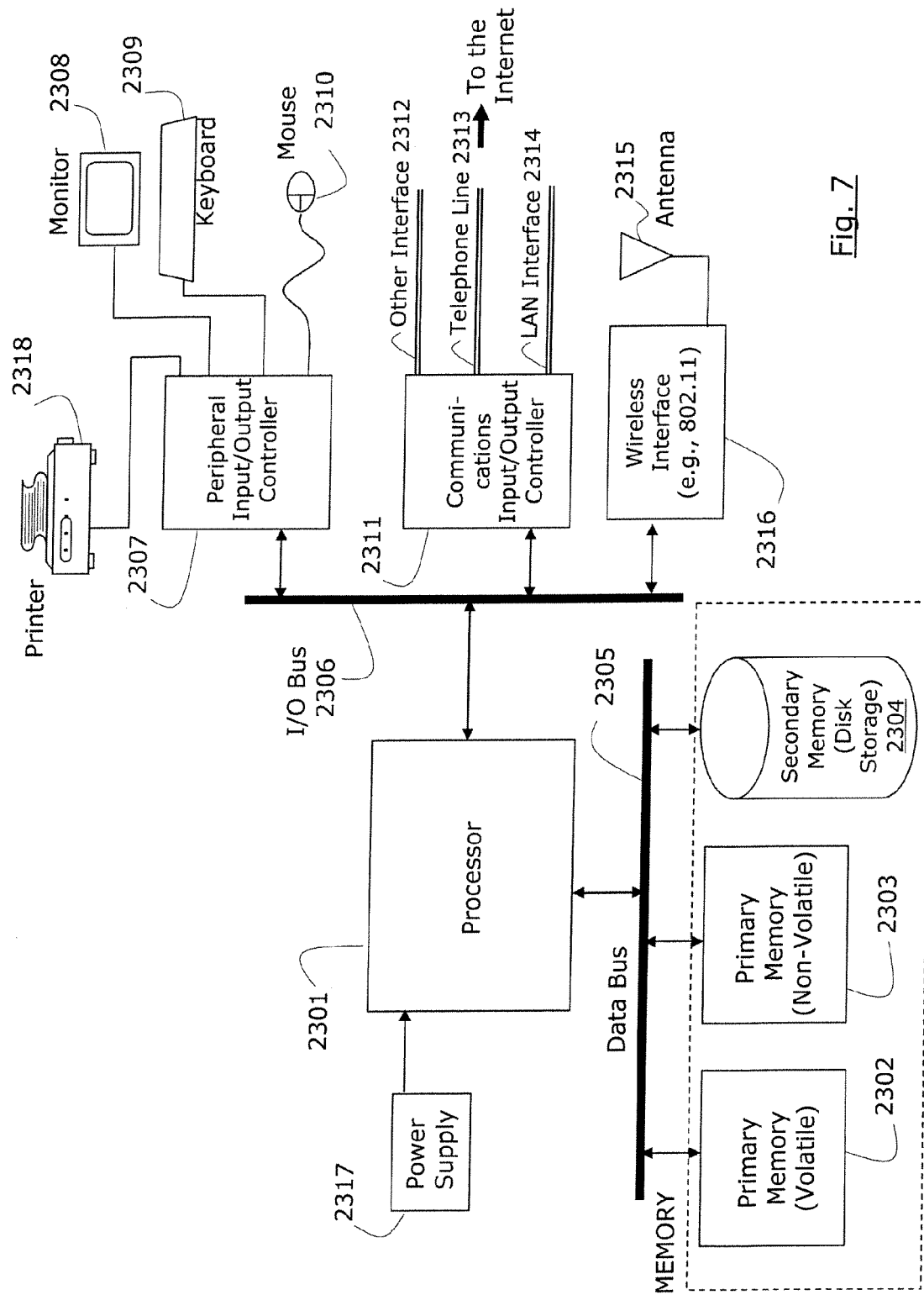
FIG. 7 is an illustration of a computer, according to one embodiment of the present invention.

In several of the embodiments of the invention referenced herein, a computer is referenced. The computer, for example, may be a mainframe, desktop, notebook or laptop, hand-held, or a handheld device such as a data acquisition and storage device. In some instances the computer may be a "dumb" terminal used to access data or processors communicating over a network. Turning to FIG. 7, one embodiment of a computer is illustrated that can be used to practice aspects of the present invention. In FIG. 7, a processor 2301, such as a microprocessor, is used to execute software instructions for carrying out the defined steps. The processor 2301 receives power from a power supply 2317 that may also provide power to the other components as necessary. The processor 2301 communicates using a data bus 2305 that is typically sixteen or thirty-two bits wide (e.g., in parallel). The data bus 2305 is used to convey data and program instructions, typically, between the processor 2301 and the memory. In the present embodiment, the memory may be considered to include a volatile primary memory 2302 such as RAM or another form of memory which retains the contents only during operation, or it may be non-volatile 2303, such as ROM, EPROM, EEPROM, FLASH, or other types of memory that retain the memory contents at all times. The memory could also be secondary memory 2304, such as disk storage, that stores large amount of data. In some embodiments, the disk storage may communicate with the processor using an I/O bus 2306 instead or a dedicated bus (not shown). The secondary memory may be a floppy disk, hard disk, compact disk, DVD, or any other type of mass storage type known to those skilled in the computer arts.

The processor 2301 also communicates with various peripherals or external devices using an I/O bus 2306. In the present embodiment, a peripheral I/O controller 2307 is used to provide standard interfaces, such as RS-232, RS422, DIN, USB, or other interfaces as appropriate to interface various input/output devices. Typical input/output devices include local printers 2318, a monitor 2308, a keyboard 2309, and a mouse 2310 or other typical pointing devices (e.g., rollerball, trackpad, joystick, etc.).

The processor 2301 typically also communicates using a communications I/O controller 2311 with external communication networks, and may use a variety of interfaces 2312 such as data communication oriented protocols such as X.25, ISDN, DSL, cable modems, etc. The communications controller 2311 may also incorporate a modem (not shown) for interfacing and communicating with a standard telephone line 2313. Finally, the communications I/O controller may incorporate an Ethernet interface 2314 for communicating over a LAN. Any of these interfaces may be used to access the Internet, intranets, LANs, or other data communication facilities.

Finally, the processor 2301 may communicate with a wireless interface 2316 that is operatively connected to an antenna 2315 for communicating wirelessly with another devices, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 8:
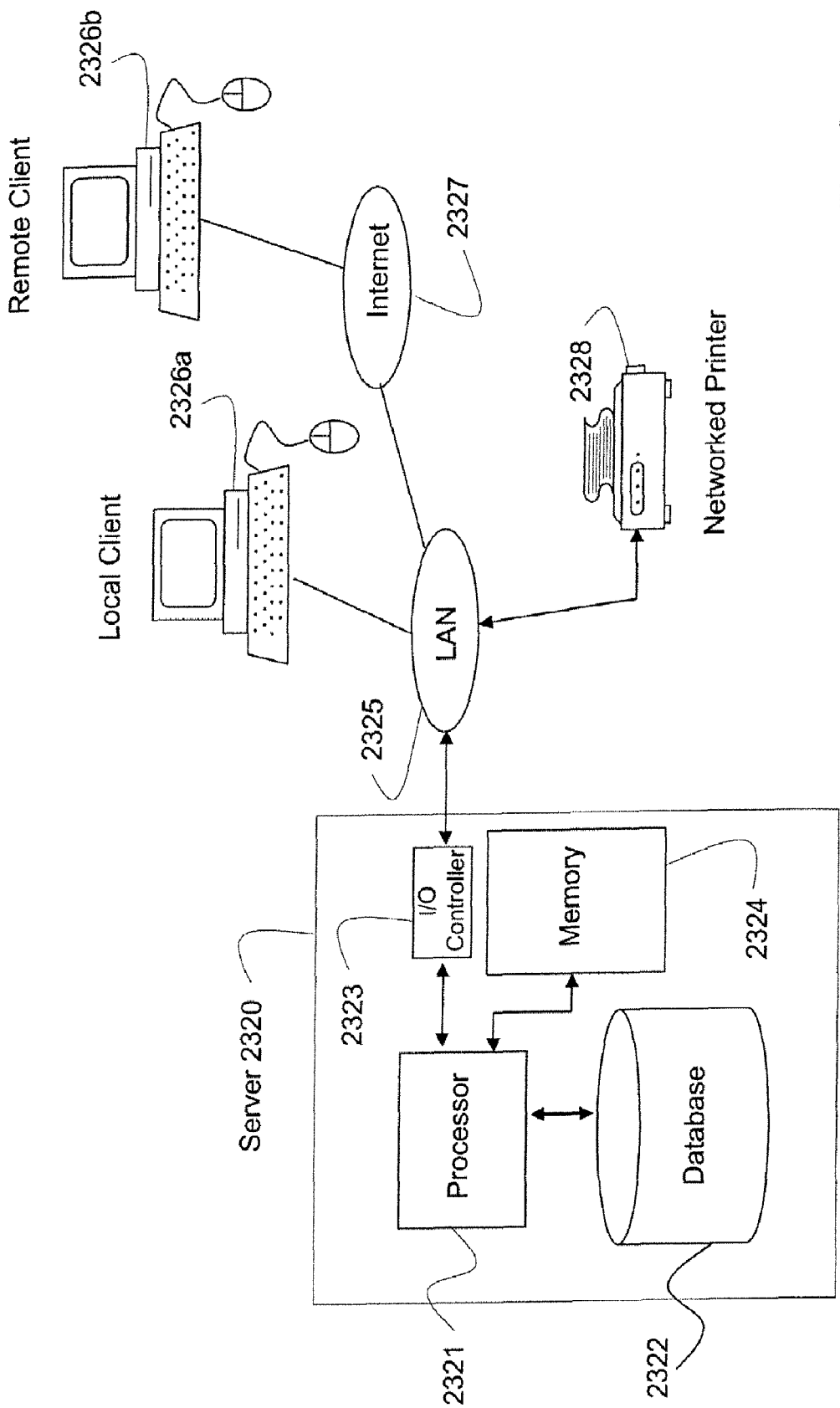
FIG. 8 is an illustration of a distributed server-client network, according to one embodiment of the present invention.

An alternative embodiment of a processing system that may be used is shown in FIG. 8. In this embodiment, a distributed communication and processing architecture is shown involving a server 2320 communicating with either a local client computer 2326a or a remote client computer 2326b. The server 2320 typically comprises a processor 2321 that communicates with a database 2322, which can be viewed as a form of secondary memory, as well as primary memory 2324. The processor also communicates with external devices using an I/O controller 2323 that typically interfaces with a LAN 2325. The LAN may provide local connectivity to a networked printer 2328 and the local client computer 2326a. The networked printers 2328 may be located in the same facility as the server, though not necessarily in the same room. Communication with remote devices typically is accomplished by routing data from the LAN 2325 over a communications facility to the Internet 2327. A remote client computer 2326b may execute a web browser, so that the remote client 2326b may interact with the server as required by transmitted data through the Internet 2327, over the LAN 2325, and to the server 2320.

In one embodiment, as illustrated in FIG. 8, the architecture may include a server 2320, one or more computer networks, and one or more local or remote clients 2326a, 2326b distributed in a multi-tiered server-client relationship. The one or more computer networks may include a variety of types of computer networks such as the internet 2327, a private intranet, a private extranet, a public switch telephone network (PSTN), a wide area network (WAN), a local area network (LAN) 2325, or any other type of network known in the art. The network, such as the LAN 2325, facilitates communications between the server 2320 and the one or more local clients 2326a. The LAN 2325 and the internet 2327 facilitate communications between the server 2320 and the one or more remote clients 2326b. Communication between two or more computer components may including, for example, a network transfer, a file transfer, an applet transfer, an e-mail, a Hyper-Text Transfer Protocol (HTTP) message, an XML message, a datagram, an object transfer, a binary large object (BLOB) transfer, and so on. The present invention, in one embodiment, uses the internet 2327 and its highly-efficient transmission protocols to send short, quick, efficient messages and data between and among the various computing components. In this aspect, the present invention is optimized for efficient communications and data transfer.

Those skilled in the art of data networking will realize that many other alternatives and architectures are possible and can be used to practice the principles of the present invention. The embodiments illustrated in FIG. 7 and FIG. 8 can be modified in different ways and be within the scope of the present invention as claimed.

CONCLUSION

The described embodiments of the invention are intended to be merely exemplary. Of course, it is not possible to describe every conceivable combination of components or methodologies for purpose of describing the systems, methods, and apparatuses for accomplishing the various objectives of the inventive plan. One of ordinary skill in the art may recognize that further combinations and permutations are possible. Accordingly, the description in this application is intended to embrace any and all alterations, modifications, and variations that fall within the scope of the appended claims and their equivalents.

The invention claimed is:

1. A system for estimating the size of a select parcel having a weight and associated with one of a plurality of size categories, said system comprising:
  one or more databases storing data associated with a plurality of parcels, said data including weight data, size data, and size category data for each of said plurality of parcels; and
  a size estimating module configured to include program code instructions to:
  retrieve weight and size data from said one or more databases for at least a portion of said plurality of parcels associated with the same size category as said select parcel;
  analyze said retrieved data to determine a mathematical relationship between weight and size; and
  estimate the size of said select parcel based on said mathematical relationship and said weight of said select parcel.

2. The system of claim 1, wherein said categories are further based on a service level.

3. The system of claim 1, wherein the mathematical relationship is a polynomial equation in which said calculated size equals:
  a numerical constant (c1); plus
  a first coefficient (c2) multiplied times a first variable;
  wherein said analysis produces a value for the numerical constant and the first coefficient that are specific to said plurality of parcels in said same size category.

4. The system of claim 1, wherein said mathematical relationship is a polynomial equation in which the parcel size equals:
  a numerical constant (c1); plus
  a first coefficient (c2) multiplied times a first variable; plus
  a second coefficient (c3) multiplied times a second variable,
  wherein the statistical analysis produces a value for the numerical constant, the first coefficient, and the second coefficient that are specific to said plurality of parcels in said same size category.

5. The system of claim 1, wherein size data for at least one of said plurality of parcels is determined based on the associated category.

6. A method of estimating the size of a first parcel of a plurality of parcels shipped by a shipping enterprise comprising the steps of:
  associating each of said plurality of parcels with one of a plurality of categories based on relative size;
  assigning said first parcel to a first category based on its size, wherein said first category is taken from said plurality of categories;
  retrieving data including weight and size associated with a plurality of parcels in said first category;
  analyzing said data for said plurality of parcels in said first category to determine a mathematical relationship between weight and size; and
  applying said mathematical relationship to calculate the size of said first parcel based on its weight.

7. The method of claim 6, wherein said step of associating is further based on a service level and wherein said step of assigning is further based on a service level.

8. The method of claim 6, wherein the mathematical relationship is a polynomial equation in which the parcel size equals:
  a numerical constant (c1); plus
  a first coefficient (c2) multiplied times a first variable;
  wherein the statistical analysis produces a value for the numerical constant and the first coefficient that are specific to said plurality of parcels in said first category.

9. The method of claim 6, wherein the mathematical relationship is a polynomial equation in which the parcel size equals:
  a numerical constant (c1); plus
  a first coefficient (c2) multiplied times a first variable; plus
  a second coefficient (c3) multiplied times a second variable,
  wherein the statistical analysis produces a value for the numerical constant, the first coefficient, and the second coefficient that are specific to said plurality of parcels in said first category.

10. The method of claim 6, wherein said step of retrieving further comprises:
  gathering weight data from a plurality of sources;
  prioritizing said plurality of sources; and
  retrieving weight data from one of said plurality of sources based at least in part on said prioritizing step.

11. The method of claim 6 further comprising the steps of:
  assigning a permissible size range for each of said categories; and comparing said size data to said range to determine if said size data for each of said plurality of parcels is acceptable for use in determining said mathematical relationship.

12. A system for forecasting capacity requirements for a delivery lane comprising:
a forecasting database storing data relating to a plurality of parcels for said delivery lane, said data for each parcel including weight data, size data, and data indicating one of a plurality of categories based on size, and wherein said size data for at least some of said plurality of parcels is an estimated value; and
a forecasting module configured to include program code instructions to:
retrieve said size data from said forecasting database;
calculate a cumulative size of said parcels by combining the size data for each of said plurality of parcels; and
forecast size capacity requirements by applying a growth rate to said cumulative size.

13. The system of claim 12, further comprising a size estimating module configured to:
retrieve data from a second database for a plurality of parcels having both weight and size data;
analyze said retrieved data to determine a mathematical relationship between weight and size for each of said plurality of categories;
calculate the size of at least one parcel not having size data based on said mathematical relationship for the at least one parcel's associated category; and
build said forecasting database with data retrieved from said second database and calculated size data.

14. A method for forecasting capacity needs for a delivery lane comprising the steps of:
gathering parcel data comprising weight data, size data and size category data for a plurality of parcels associated with said delivery lane wherein components of said parcel data are collected from a plurality of sources;
building a database containing said parcel data;
combining said size data to obtain a cumulative size;
forecasting a future cumulative size by applying a growth rate to said cumulative size; and
comparing said forecasted future cumulative size to a present capacity for said delivery lane to determine future equipment needs.

15. The method of claim 14, wherein said step of gathering parcel data comprises:
gathering parcel data for a first parcel of said plurality of parcels, said first parcel having a first weight data and a first size category;
retrieving data including weight and size associated with a plurality of parcels in said first category;
analyzing said data for said plurality of parcels in first size category to determine a mathematical relationship between weight and size; and
applying said mathematical relationship to calculate the size of said first parcel based on said first weight.

16. The method of claim 15, wherein the mathematical relationship is a polynomial equation in which said calculated size equals:
a numerical constant ($c_1$); plus
a first coefficient ($c_2$) multiplied times a first variable;
wherein said statistical analysis produces a value for the numerical constant and the first coefficient that are specific to said plurality of parcels in said first category.

17. The method of claim 15, wherein said mathematical relationship is a polynomial equation in which the parcel size equals:
a numerical constant ($c_1$); plus
a first coefficient ($c_2$) multiplied times a first variable; plus
a second coefficient ($c_3$) multiplied times a second variable,
wherein the statistical analysis produces a value for the numerical constant, the first coefficient, and the second coefficient that are specific to said plurality of parcels in said first category.

18. The method of claim 15, wherein said parcel data further comprises a service level category.

19. The method of claim 14, further comprising the step of prioritizing said plurality of sources for said weight data and said size data and wherein said step of building a database further comprises selecting weight data and size data base at least in part on said prioritizing step.

20. The method of claim 14, further comprising the step of forecasting the number of containers required by dividing said forecasted future cumulative size by a predetermined container volume.

21. The method of claim 14, wherein said delivery lane is identified by a first delivery center and a second delivery center.

22. A computer program product for estimating the size of a first parcel, the computer program product embodied on one or more computer-readable media and comprising computer-executable instructions for:
associating each of a plurality of parcels with a category based on relative size;
assigning said first parcel to one of said categories based on its size;
retrieving data including weight and size associated with a plurality of parcels in said one of said categories;
analyzing said data for said plurality of parcels associated with said one of said categories to determine a mathematical relationship between weight and size; and
applying said mathematical relationship to calculate the size of said first parcel based on its weight.

23. The computer program product of claim 22 further comprising computer-executable instructions for:
retrieving a subset of said size data based on an origin and a destination;
calculating a cumulative size for said subset by combining the size data for each of said parcels in said subset; and
forecasting equipment requirements by applying a growth factor to said cumulative size.

24. The computer program product of claim 23, wherein said subset of size data includes the calculated size of said first parcel.

* * * * *